Jan. 17, 1956 W. M. KELLER 2,731,306
FLUID COOLED JOURNAL BEARING
Filed Oct. 29, 1953 2 Sheets-Sheet 2

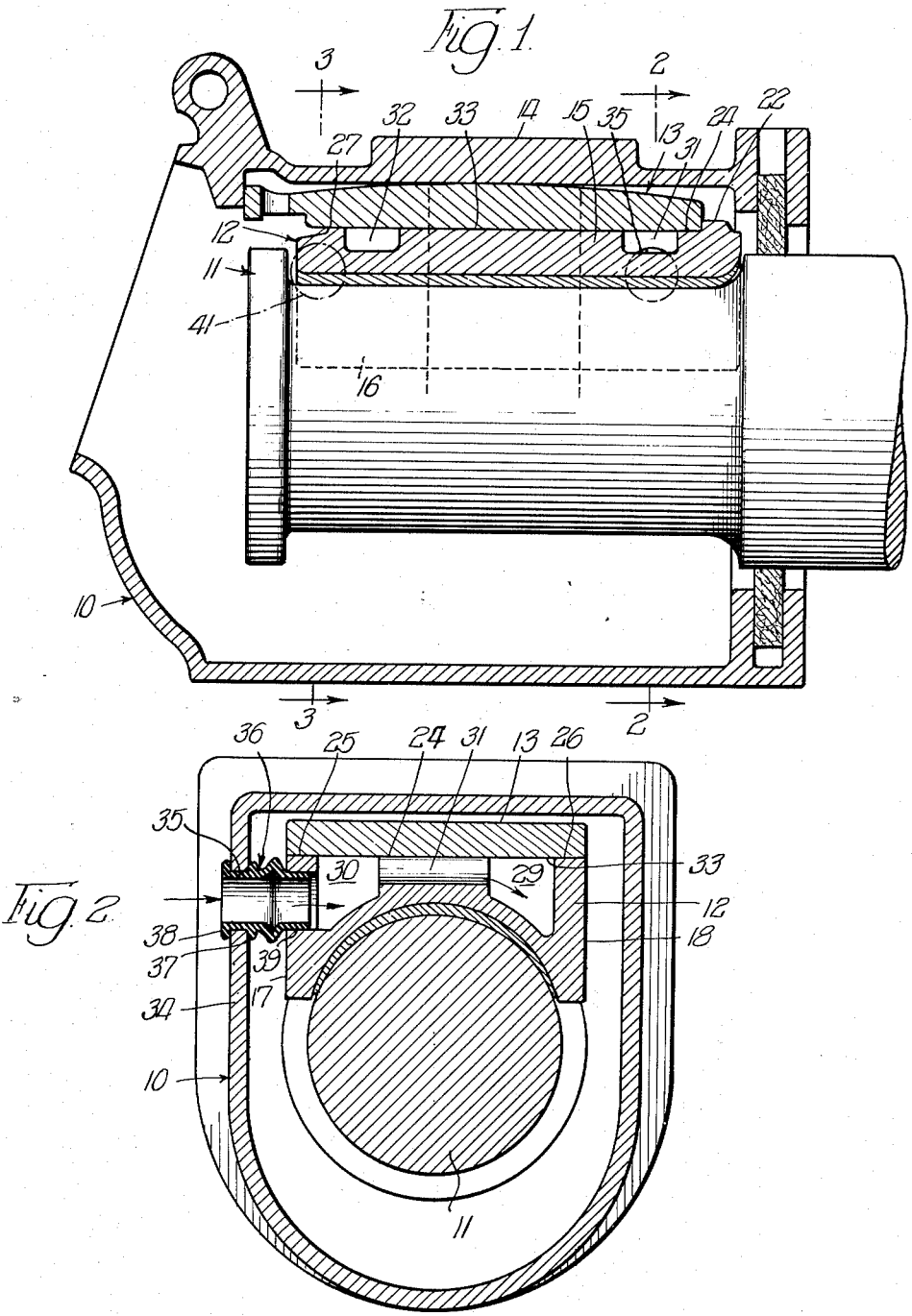

INVENTOR.
William M. Keller,
BY
ATTY.

United States Patent Office 2,731,306
Patented Jan. 17, 1956

2,731,306

FLUID COOLED JOURNAL BEARING

William M. Keller, Evanston, Ill.

Application October 29, 1953, Serial No. 389,026

3 Claims. (Cl. 308—77)

This invention relates to journal bearings especially adapted for use in railway car journal boxes, and more particularly to means for ventilating and cooling the bearing, wedge and associated parts. The invention has been developed for railway car journal bearings, but it should be understood that the invention is not to be limited to this type of service because the principles involved are equally applicable to other types of journal bearings.

The development of excessive heat in railway car journal boxes, a condition known as hot-boxes, has long been a serious problem. An over-heated bearing will cause damage to the bearing and journal, delays in train operation, and occasionally a serious accident. When a railway car is in service, the normal temperature in the journal and journal bearing is in the vicinity of 100 degrees F. above the surrounding open air temperature. Under abnormal conditions such as may occur with a waste grab between the bearing and the car journal, or an insufficient oil supply, the oil film between the bearing and journal is broken down to a degree depending on the severity of the condition. This causes a rise in the temperature of the journal and journal bearing. If the temperature rises to the range of approximately 350 degrees F. to 400 degrees F., the oil in the journal box will burn and all lubrication between the journal and the bearing is destroyed.

My invention is designed to ventilate and cool the bearing, wedge and associated parts, and to dissipate a substantial portion of the heat generated when the railway car is in service. This will insure a cooler running journal bearing and consequently the range of temperature rise in the journal bearing will be extended before complete breakdown of lubrication. This will permit safe operation of the railway car for longer periods of time under temporary abnormal heat conditions in the journal bearing.

The invention comprises generally a railway car journal bearing having a flat upper surface with grooves therein adapted to function as passageways for the circulation of a fluid such as air. An associated wedge, which is disposed in a conventional manner between the upper surface of the journal bearing and the journal box of the railway car, has a flat undersurface which bears on the flat portion of the upper surface of the journal bearing. The wedge covers the grooves formed in the upper surface of the bearing, and passageways are thus formed between the journal bearing and the undersurface or bottom of the wedge. Flexible conduits are provided through which fresh air from outside the journal box is directed through the passageways when the car is in motion in either direction, to thereby cool the journal bearing, wedge and associated parts.

The principal object of the invention is to reduce the running temperature of the journal bearing, wedge and associated parts by so constructing the bearing and wedge that a cooling current of air is forced between the upper surface of the bearing and the undersurface of the wedge during all movement of the railway car.

A further object of the invention is to provide a journal bearing and associated wedge which can be used in car journal boxes now in service without the necessity of materially altering the conventional journal box.

A still further object of the invention is to provide forced air ventilation of a railway car journal bearing and wedge in such a manner that the cooling air which might contain dirt or other foreign material does not enter the interior of the journal box and contaminate the lubricant and packing therein.

Another object of the invention is to provide means for ventilating and cooling a journal bearing and its associated parts, which includes passageways formed without the use of any expensive machining or threaded fittings, through which passageways a cooling fluid can be circulated.

Another object is to provide grooves in the upper surface of a journal bearing, which grooves may be formed without complicated coring or machining.

A further object of the invention is to provide ventilating passageways of such design in the upper surface of a journal bearing that a large percentage of the total area of the upper surface of the bearing will be directly exposed to the heat dissipating effect of the circulating air when the car is in motion.

A further object of the invention is to provide air passageways in the upper surface of a journal bearing, the passageways being so arranged that air directed therethrough from outside the journal box will tend to prevent the accumulation of dirt or other foreign matter in the passageways.

Further objects and advantages of the invention will become apparent as the disclosure proceeds and the description is read in conjunction with the accompanying drawings in which:

Fig. 1 is a view in longitudinal vertical section through a journal box showing a railway car journal, a journal bearing and associated wedge embodying the features of the invention;

Fig. 2 is a vertical section taken transversely through the journal box of Fig. 1 along the line 2—2;

Similar reference numerals refer to similar parts throughout the drawings.

Figure 3:
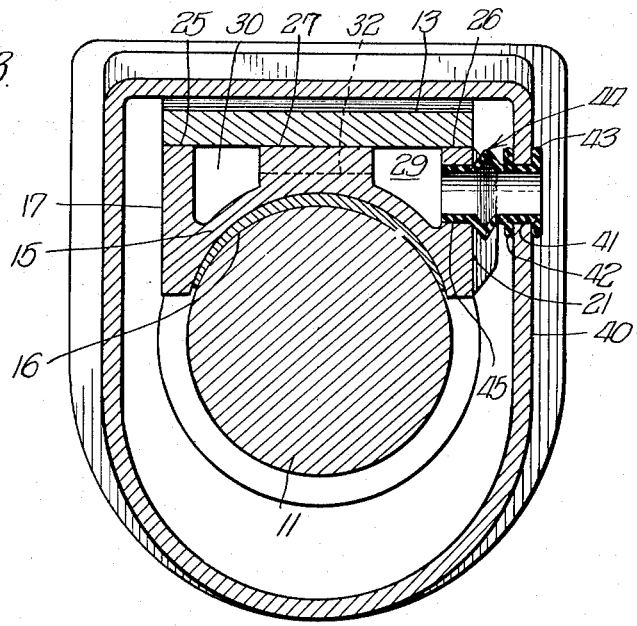
Fig. 3 is a vertical section taken transversely along the line 3—3 of Fig. 1.

As shown in Fig. 1 of the drawings, 10 indicates in general a journal box of standard or well known construction within which is housed a journal 11 at the end of a conventional axle not shown in full. A journal bearing 12 constructed according to the present invention is adapted to be mounted on the journal 11 in a well known manner and is associated with the wedge 13 interposed between the journal bearing 12 and the upper wall 14 of the journal box 10.

Figure 4:
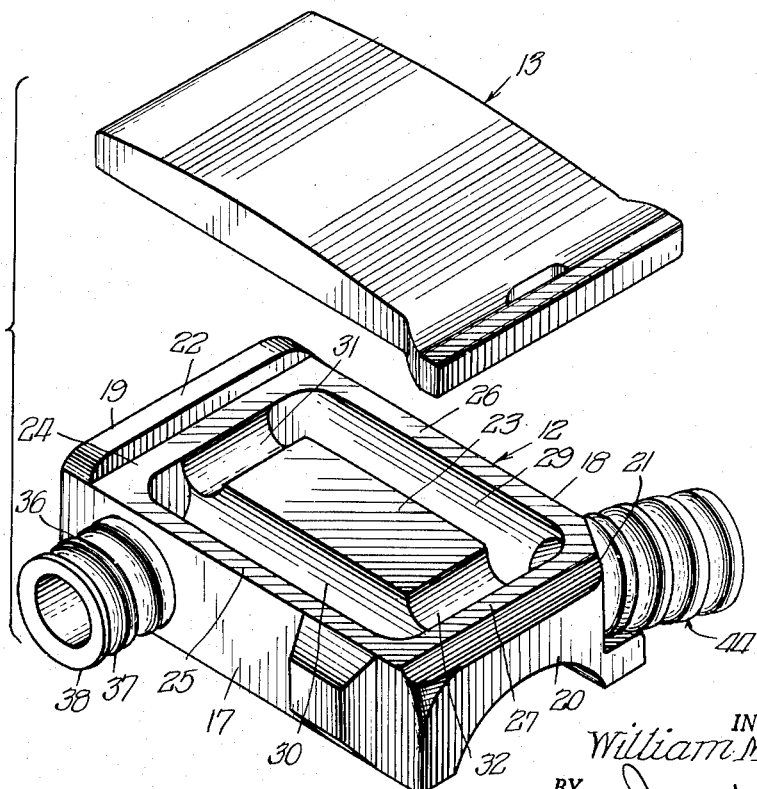
Fig. 4 is a perspective view of the journal bearing together with its associated wedge.

Referring more particularly to Figs. 2, 3 and 4, the journal bearing 12 comprises a backing member or brass generally indicated by the numeral 15 having the usual soft lining or bearing surface 16 secured to the curved inner surface thereof and adapted to contact the outer surface of the journal 11. The backing 15 of the journal bearing 12 has vertical side walls 17 and 18, rear wall 19 and front wall 20. As shown at Fig. 4 of the drawings, intermediate wall 21, disposed at an angle, joins the front wall 20 and the side wall 18. At the rear of the backing there is a transversely disposed upstanding lug 22. The upper surface of the backing 15 includes a central portion 23, the top surface of which lies flush with the top surface 24 of the rear wall 19, top surface 25 of side wall 17, top surface 26 of side wall 18 and top surface 27 of front wall 20. Two parallel longitudinally disposed grooves 29 and 30 are formed in the top surface of the backing 15. Two parallel transversely disposed grooves 31 and 32, which are somewhat shallower than the grooves 29 and 30, join the ends of grooves 29 and 30, as clearly illustrated at Fig. 4. When the wedge 13 is in position, with the rear wall thereof abutting the upstanding lug 22, as shown at Fig. 1, the flat undersurface 33 of the wedge bears on the top surface of the central portion 23 and the top surfaces 24, 25, 26 and 27 so as to close the top of grooves 29, 30, 31 and 32 and thus form continuous passageways disposed between the journal bearing 12 and the wedge 13.

Referring particularly to Fig. 2 of the drawings, side wall 34 of the journal box 10 has an opening 35 therethrough which is adapted to receive one end of a flexible tubular conduit member 36 formed of neoprene or other suitable material. The conduit member 36 has a circumferential flange 37 adapted to abut the inner side of the wall of the journal box surrounding the opening 35, and a spaced circumferential flange 38 adapted to abut the outer side of the wall of the journal box adjacent the opening 35. These flanges 37 and 38 thus secure the outer end of the flexible conduit member 36 to the side wall 34 of the journal box. The other end of the member 36 is frictionally received in an opening 39 formed in the side wall 17 of the backing 15. The opening 39 communicates with the groove 30 in the upper portion of the backing 15. The configuration of the flexible member 36 is designed to accommodate movement of the bearing with respect to the journal box.

Referring particularly to Fig. 3 of the drawings, the side wall 40 of the journal box has an opening 41 adapted to receive one end of a flexible tubular conduit member 44 which is similar in construction to the tubular member 36. The flexible tubular conduit member 44 is secured to the side wall 40 by means of spaced circumferential flanges 42 and 43. The other end of the tubular conduit member 44 is frictionally received in the opening 45 provided in the wall 21 of the backing member 15. The opening 45 communicates with the groove 29. The wall 21 of the backing 15 is disposed at an angle to the side and front walls of the bearing in order that the aligned side opening 41 in wall 40 of the journal box may be in such a position that the opening 41 is clear of all structure of the truck frame.

When the railway car is in motion in either direction, a current of cooling air from outside the journal box will be forced through the opening 35 or the opening 41, dependent on the direction of travel of the car. The current of air travels through the respective tubular members into the passageways disposed between the journal bearing and the wedge. The air circulates through the passageways and then passes outwardly through the opposite tubular member and is discharged to the atmosphere. As the operating temperature of the bearing is always above the atomspheric temperature, the air flowing through the passageways picks up heat from the surfaces exposed to the air current, and this heat energy raises the temperature of the circulating air prior to its discharge to the atmosphere. The tubular members 36 and 44 are made flexible so as to permit them to follow any rocking or lateral movement of the journal bearing that occurs during the motion of the railway car.

Comprehensive tests have indicated that this invention substantially reduces the running temperature of a journal bearing and its associated parts, and thus greatly reduces the likelihood of the development of an over-heated condition or a hot-box. With this invention, without structurally weakening the journal bearing, the surface area which can be exposed to the cooling and heat dissipating effect of the current of circulating air is larger than the surface area in contact with the journal. For example, in a 6 inch by 11 inch journal bearing, constructed in accordance with the present invention, the portion of the bearing which contacts the journal has an area of approximately 67.8 square inches, while the area on the top surface of such a bearing which is exposed to the circulating air can be more than 75 square inches.

It is obvious that a bearing constructed in accordance with the present invention is to a large extent self-cleaning because of the fact that particles of dust, etc., in the air entering the openings on one side of the journal box will be carried through the passageways and to the atmosphere through the opening on the other side of the box by means of the blast of air aided by the relatively low pressure on the exit side, due to the motion of the car.

Moreover, the provision of the flexible tubular conduit members 36 and 44 and the manner of their connection with the walls of the journal box and the bearing insures that no dust or foreign matter will enter the box to contaminate the oil and packing therein.

It will thus be evident that the present invention provides means for ventilating and cooling a journal bearing and associated wedge which can be readily used in conventional journal boxes with minor alterations. The passageways on the upper surface of the journal bearing can be easily formed without machining operations and the tubular members disposed between the walls of the journal box and the bearing can be easily fitted into place without the expense of threaded connections.

The foregoing description of my invention is made for the purpose of disclosure and to illustrate the principles involved, and will suggest various substitutions and changes that may be made under my basic concept. The right is reserved to all such substitutions and modifications that lie within the scope of the appended claims.

I claim:

1. A railway car journal box having therein an axle journal upon which a journal bearing is mounted, there being a pair of spaced horizontally disposed longitudinal grooves and a pair of spaced horizontally disposed transverse grooves formed in the top surface of the journal bearing, the ends of the longitudinal grooves intersecting with the ends of the transverse grooves to form continuous passageways for the circulation of air, a wedge having a flat under surface disposed between the journal bearing and the top wall of the journal box, said wedge defining the top of said passageways, a pair of flexible tubular conduits, one of said conduits extending from said passageways to an opening in the upper part of one side wall of the journal box, and the other of said conduits extending from said passageways to an opening in the upper part of the opposite side wall of the journal box, each of said conduits disposed horizontally between said passageways and one of said openings in a side wall of the journal box, the conduit members affording means through which air from the exterior of the journal box flows through the passageways and removes heat units from the journal bearing and wedge.

2. The combination of a railway car journal box, an axle journal and a journal bearing within the box, said journal bearing having a top surface including a central portion surrounded by horizontally disposed grooves providing passageways for the circulation of air, a wedge having a flat under surface disposed between the journal bearing and the top wall of the journal box and defining the top of said passageways, an opening in the upper part of each side wall of the journal box, each of said openings lying in a horizontal plane passing through the upper part of said journal bearing, and a flexible tubular conduit member extending from each of said openings to said passageways, one end of each conduit member being frictionally secured to an opening in the side of said journal bearing and the opposite end of each conduit member passing through one of said openings in a side wall of the journal box and secured thereto by spaced circumferential flanges integral with said conduit member, the flanges abutting respectively the inner and outer surfaces of the side wall of the journal box, said conduit members affording means through which air from the exterior of the journal box flows horizontally to the passageways disposed between the journal bearing and the wedge.

3. The combination defined by claim 2 wherein the total area of the upper surface of the journal bearing in direct contact with circulating air is greater than the area of the journal bearing in contact with the journal.

References Cited in the file of this patent

UNITED STATES PATENTS

| | | |
|---|---|---|
| 159,824 | Hussey | Feb. 16, 1875 |
| 414,221 | Hyde | Nov. 5, 1889 |
| 441,376 | Patton | Nov. 25, 1898 |
| 2,283,939 | Miller | May 26, 1942 |
| 2,405,170 | Troxler | Aug. 6, 1946 |